United States Patent [19]

Kerth et al.

[11] Patent Number: 4,900,798

[45] Date of Patent: * Feb. 13, 1990

[54] PREPARATION OF ETHENE POLYMERS USING A ZIEGLER CATALYST SYSTEM

[75] Inventors: Juergen Kerth, Maxdorf; Rudolf Mueller-Mall, Neuhoren; Guenther Schweier, Friedelsheim, all of Fed. Rep. of Germany

[73] Assignee: BASF Aktiengesellschaft, Ludwigshafen, Fed. Rep. of Germany

[*] Notice: The portion of the term of this patent subsequent to Dec. 15, 2004 has been disclaimed.

[21] Appl. No.: 97,068

[22] Filed: Sep. 16, 1987

[30] Foreign Application Priority Data

Sep. 17, 1986 [DE] Fed. Rep. of Germany ....... 3631534

[51] Int. Cl.$^4$ .......................... C08F 4/64; C08F 10/02
[52] U.S. Cl. ..................... 526/152; 502/114; 526/352; 526/901; 526/903; 526/904
[58] Field of Search .......................... 526/152

[56] References Cited

U.S. PATENT DOCUMENTS

| | | | |
|---|---|---|---|
| 4,210,729 | 7/1980 | Hermans et al. ..................... | 526/142 |
| 4,329,251 | 5/1982 | Sunada et al. ..................... | 252/429 B |
| 4,463,145 | 7/1984 | Sunada et al. ..................... | 526/142 |
| 4,605,714 | 8/1986 | Baker ..................... | 526/124 |
| 4,713,430 | 12/1987 | Kerth et al. ..................... | 526/904 |

FOREIGN PATENT DOCUMENTS 52-142691 11/1977 Japan ..................... 526/904

*Primary Examiner*—Edward J. Smith
*Attorney, Agent, or Firm*—Keil & Weinkauf

[57] ABSTRACT

Finely divided ethane polymers are prepared using a Ziegler catalyst system consisting of (1) a titanium-containing catalyst component which has been obtained by (1.1) precipitation in an organic liquid comprising (1.1.1) a solution of titanium tetrachloride in a hydrocarbon, (1.1.2) a solution of a certain organoaluminum compound in a hydrocarbon and (1.1.3) an alpha-monoalkene, and (2) an aluminum-containing catalyst component. In this process, the component (1) used is a component where (1.1) precipitation has been carried out at relatively low temperatures in an organic liquid which has a relatively high viscosity at the precipitation temperature and conists of (1) a liquid hydrocarbon an (b) small amounts of a polymer of an alpha-monoalkene dissolved therein, with the provisos that (i) specific amounts of the organic liquid, of the organoaluminum compound and of the alpha-monoalkene are used per g mol of the titanium tetrachloride used in total, and (ii) per molar unit of the titanium tetrachloride used in total, specific amounts per minute are precipitated and specific amounts per minute of the alpha-monoalkene are introduced, and (1.2) the substance precipitated according to (1.1) has been reacted with a lithiumalkyl.

2 Claims, No Drawings

PREPARATION OF ETHENE POLYMERS USING A ZIEGLER CATALYST SYSTEM

The present invention relates to a process for the preparation of finely divided homopolymers of ethene or copolymers of ethene with minor amounts of a $C_3$–$C_8$-alpha-monoalkene, in particular a $C_4$–$C_6$-alpha-monoalkene, by polymerization of the monomer or monomers at from 30° to 150° C., in particular from 50° to 120° C., and under from 1 to 200, in particular from 5 to 50, bar using a Ziegler catalyst system consisting of (1) a titanium-containing catalyst component comprising (1.1) a precipitated product which has been obtained in producing a precipitate in an initially taken organic liquid by introducing and combining, with vigorous movement, (1.1.1) a 0.1–10, in particular 1–2, molar solution of titanium tetrachloride in a liquid saturated aliphatic and/or aromatic hydrocarbon of 5 to 10, in particular 6 to 8, carbon atoms, (1.1.2) a 0.1–10, in particular a 1–2, molar solution of an organoaluminum compound of the empirical formula $R_nAlCl_{3-n}$, where n is from 1.5 to 3, in particular from 1.5 to 2, and R is alkyl of 1 to 12, in particular 2 to 4, carbon atoms, in a liquid saturated aliphatic and/or aromatic hydrocarbon of 5 to 10, in particular 6 to 8, carbon atoms, and (1.1.3) a $C_2$–$C_8$-alpha-monoalkene, preferably a $C_2$–$C_4$-alpha-monoalkene, in particular ethene, and (2) an aluminum-containing catalyst component which is a trialkylaluminum which contains 1 to 12, in particular 2 to 4, carbon atoms per alkyl group, with the proviso that the atomic ratio of titanium from the catalyst component (1) to aluminum from the catalyst component (2) is from 1:1 to 1:200, in particular from 1:5 to 1:20.

Polymerization processes of this type are known, for example from U.S. Pat. Nos. 4,329,251 and 4,463,145.

A typical example of this type of process is that the Ziegler catalyst systems used affect the morphological properties of the polymers in a certain way, for example giving a uniform particle size and/or reducing the fraction of very fine particles and/or providing high bulk density; this is important for technical control of the polymerization systems, working up of the polymers and/or the processability of the polymers.

Like other similar polymerization processes, the known polymerization processes of the type in question have the disadvantage that the stated aims are not satisfactorily achieved under certain process conditions, for example polymerization in the gas phase or at elevated temperatures.

It is an object of the present invention further to develop the process described at the outset so that polymers having advantageous morphological properties are obtained, particularly when the process is carried out as a dry-phase polymerization process.

We have found that this object is achieved if, in the polymerization process defined at the outset, the Ziegler catalyst system used has a titanium-containing catalyst component (1) in whose preparation (1.1) the precipitate has been produced at relatively low temperatures in a relatively highly viscous, initially taken liquid containing of (a) a liquid hydrocarbon and (b) an alpha-monoalkene polymer dissolved therein, specific quantity and quantity/time ratios being observed, and (1.2) the precipitated product obtained according to (1.1) has been reacted with a lithiumalkyl.

The present invention accordingly relates to a process for the preparation of finely divided homopolymers of ethene or copolymers of ethene with minor amounts of a $C_3$–$C_8$-alpha-monoalkene, in particular a $C_4$–$C_6$-alpha-monoalkene, by polymerization of the monomer or monomers at from 30° to 150° C., in particular from 50° to 120° C., under from 1 to 200, in particular from 5 to 50, bar using a Ziegler catalyst system consisting of (1) a titanium-containing catalyst component comprising (1.1) a precipitated product which has been obtained in producing a precipitate in an initially taken organic liquid by introducing and combining, with vigorous movement, (1.1.1) a 0.1–10, in particular 1–2, molar solution of titanium tetrachloride in a liquid saturated aliphatic and/or aromatic hydrocarbon of 5 to 10, in particular 6 to 8, carbon atoms;

(1.1.2) a 0.1–10, in particular 1–2, molar solution of an organoaluminum compound of the empirical formula $R_nAlCl_{3-n}$, where n is from 1.5 to 3, in particular from 1.5 to 2, and R is alkyl of 1 to 12, in particular 2 to 4, carbon atoms, in a liquid saturated aliphatic and/or aromatic hydrocarbon of 5 to 10, in particular 6 to 8, carbon atoms, and (1.1.3) a $C_2$–$C_8$-alpha-monoalkene, preferably a $C_2$–$C_4$-alpha-monoalkene, in particular ethene, and (2) an aluminum-containing catalyst component which is a trialkylaluminum which contains 1 to 12, in particular 2 to 4, carbon atoms per alkyl group, with the proviso that the atomic ratio of titanium from the catalyst component (1) to aluminum from the catalyst component (2) is from 1:1 to 1:200, in particular from 1:5 to 1:20.

In the novel process, the titanium-containing catalyst component (1) used is one in which (1.1) the precipitated product has been produced at from −30° to 30° C., in particular from −10° to 10° C., in an initially taken organic liquid which has a viscosity of from 1.5 to 30, preferably from 5 to 15, in particular from 8 to 12, mm$^2$/s at the precipitation temperature and consists of (a) a liquid saturated aliphatic and/or aromatic hydrocarbon of 5 to 10, in particular 6 to 8, carbon atoms and (b) relatively small amounts, dissolved therein, of a polymer of a $C_2$–$C_6$-alpha-monoalkene, preferably a $C_3$- or $C_4$-alpha-monoalkene, in particular a homopolymer of isobutene, with the proviso that (i) a total of from 2 to 20, in particular from 3.5 to 5, liters of the initially taken organic liquid, a total of from 0.5 to 5, in particular from 1 to 2, g mol of the organoaluminum compound and a total of from 5 to 500, in particular from 20 to 100, g mol of the alpha-monoalkene are used per g mol of the titanium tetrachloride employed in total, and (ii) per molar unit of the titanium tetrachloride employed in total, from 0.002 to 0.15, in particular from 0.005 to 0.02, molar unit per minute is converted to precipitated product and from 0.02 to 1, in particular from 0.015 to 0.35, molar unit per minute of the alpha-monoalkene is introduced into the precipitation system, and (1.2) the precipitated product obtained according to (1.1), which is present in a liquid saturated aliphatic and/or aromatic hydrocarbon of 5 to 10, in particular 6 to 8, carbon atoms, is combined, with thorough mixing, with a 0.1–10, in particular 1–2, molar solution of an organolithium compound of the empirical formula LiR, where R is alkyl of 1 to 12, in particular 4 to 6, carbon atoms, in a liquid saturated aliphatic and/or aromatic hydrocarbon of 5 to 10, in particular 6 to 8, carbon atoms, with the provisos that (i) the substances combined are left at from $-10°$ to $60°$ C., in particular from $10°$ to $20°$ C., for from 0.5 to 12, in particular from 1 to 3, hours and (ii) from 0.1 to 20, in particular from 1 to 5, g mol of the organolithium compound are used per g mol of titanium in the precipitated product, the resulting solid-phase product being the titanium-containing catalyst component (1).

When the titanium-containing catalyst component (1) obtained according to the invention is used, the polymerization process as such can be carried out in virtually any relevant conventional technological embodiment, for example as a batchwise, periodic or continuous suspension polymerization process or, preferably, dry-phase polymerization process in a stirred or fluidized bed. The stated technological embodiments, ie. the technological versions of the polymerization of olefins by the Ziegler method, are well known from the literature and in practice, so that no further description is required here.

In this context, it should also be noted that the novel titanium-containing catalyst component (1), like corresponding known catalyst components, can be combined with the catalyst component (2) outside or inside the polymerization space, in the last-mentioned case, for example, by separately introducing the components, which otherwise can be handled in the form of a suspension (catalyst component (1) or solution (catalyst component (2)).

Finally, it should also be stated that the novel catalyst components (1) are suitable for the preparation of both homopolymers of ethene and copolymers of ethene, and that suitable copolymerization partners in addition to propene and oct-1-ene are, in particular, but-1-ene and hex-1-ene. The molecular weights of the polymers can be regulated in the relevant conventional manner, in particular using hydrogen as a regulator.

Regarding the novel titanium-containing catalyst component (1) as such, the following may be stated: It is prepared in two steps, which are referred to above and below as (1.1) and (1.2).

(1.1) This step consists in the preparation of a precipitated product by producing a precipitate in an initially taken organic liquid by introducing and combining, with vigorous movement, in particular, in practice, constant vigorous stirring, since the intensity of stirring is known to influence the morphology of the affected catalyst component, (1.1.1) a solution, defined in detail above, of titanium tetrachloride in a liquid hydrocarbon, (1.1.2) a solution, defined in detail above, of an organo-aluminum compound in a liquid hydrocarbon and (1.1.3) an alpha-monoalkene, defined in detail above.

This procedure is such that it constitutes familiar prior art and can be carried out by the skilled worker without difficulties, so that further description is superfluous. Regarding the composition, it should be noted that, in the present context, particularly suitable liquid hydrocarbons for the solutions under (1.1.1) and (1.1.2) are n-hexane, n-heptane and n-octane; however, other examples of suitable substances are toluene and cyclohexane. Particularly suitable organoaluminum compounds for the solution under (1.1.2) are in fact diethylaluminum chloride and aluminum sesquichlorides; however, it is also possible to use, for example, trioctylaluminum. Regarding the alpha-nonoalkene under (1.1.3), ethene is outstandingly suitable, propene and 4-methylpent-1-ene are very suitable and, for example, but-1-ene and hex-1-ene are suitable.

Within the predetermined framework outlined, the one novel feature according to the invention is that the precipitate is produced at from $-30°$ to $30°$ C., in particular from $-10°$ to $10°$ C., in an initially taken organic liquid which has a viscosity of from 1.5 to 30, preferably from 5 to 15, in particular from 8 to 12, mm$^2$/s at the precipitation temperature and consists of (a) a liquid saturated aliphatic and/or aromatic hydrocarbon of 5 to 10, in particular 6 to 8, carbon atoms and (b) relatively small amounts, dissolved therein, of a polymer of a $C_2$–$C_6$-alpha-monoalkene, preferably a $C_3$- or $C_4$-alpha-monoalkene, in particular a homopolymer of isobutene, with the provisos that (i) a total of from 2 to 20, in particular from 3.5 to 5, liters of the initially taken organic liquid, a total of from 0.5 to 5, in particular from 1 to 2, g mol of the organoaluminum compound and a total of from 5 to 500, in particular from 20 to 100, g mol of the alpha-monoalkene are used per g mol of the titanium tetrachloride used in total and, (ii) per molar unit of titanium tetrachloride used in total, from 0.002 to 0.15, in particular from 0.005 to 0.02 molar unit per minute is converted to precipitated product and from 0.02 to 1, in particular from 0.15 to 0.35, molar unit per minute of the alpha-monoalkene is introduced into the precipitation system.

Of considerable importance here is the initially taken organic liquid which (i) consists of two components, ie. (a) the liquid hydrocarbon and (b) the alpha-monoalkene polymer dissolved therein, and which (ii) must have a viscosity in the abovementioned range at the selected precipitation temperature; the particular viscosity desired can be obtained in a very simple manner via the dissolved amount of the chosen alpha-monoalkene polymer. The higher the amount of this polymer, the higher the viscosity.

Regarding the composition of the initially taken, organic liquid in question, the following may be stated: Particularly suitable liquid hydrocarbons are n-hexane, n-heptane and n-octane, and examples of suitable hydrocarbons are toluene and cyclohexane.

Regarding the alpha-monoalkene polymers, it may generally be stated that it is advantageous if they have solution viscosities (according to DIN 53,728/Sheet 4) of from 100 to 800, in particular from 500 to 700, cm$^3$/g.

Individual alpha-monoalkene polymers which are suitable according to the invention are primarily homopolymers of isobutene, followed by, for example, poly-1-hexene.

Precipitated products prepared according to step (1.1) and having a titanium content of from 1.5 to 4% by weight have proven particularly suitable for the purposes of the present invention.

(1.2) This step consists in converting the precipitated product obtained in step (1.1) with an organolithium compound of the empirical formula LiR, the said compound being defined in detail above.

This second feature according to the invention consists in particular in combining the precipitated product obtained in (1.1) and present in a liquid saturated aliphatic and/or aromatic hydrocarbon of 5 to 10, in particular 6 to 8, carbon atoms, with thorough mixing, with a 0.1-10, in particular 1-2, molar solution of an organolithium compound of the empirical formula LiR, where R is alkyl of 1 to 12, in particular 6 to 8, carbon atoms, in a liquid saturated aliphatic and/or aromatic hydrocarbon of 5 to 10, in particular 6 to 8, carbon atoms, with the provisos that (i) the substances combined are left at from −10° to 60° C., in particular from 10° to 20° C., for from 0.5 to 12, in particular from 1 to 3, hours and (ii) from 0.1 to 20, in particular from 1 to 5, g mol of the organolithium compound are used per g mol of titanium in the precipitated product; the resulting solid-phase product is the novel titanium-containing catalyst component (1).

Regarding the composition in step (1.2), it may be stated that the same applies to the liquid hydrocarbon as in step (1.1) and that the preferred lithiumalkyl is n-butyllithium.

Suitable aluminum-containing catalyst components (2) of the Ziegler catalyst system to be used according to the invention are the relevant conventional trialkylaluminum compounds; they are sufficiently well known from the literature and in practice that no further discussion is required here. Examples of outstanding members are triethylaluminum, triisobutylaluminum and tri-n-butylaluminum.

Finally, it may also be stated that the novel titanium-containing catalyst components (1) are sensitive to hydrolytic and oxidative effects. Hence, the relevant conventional safety measures employed for the Ziegler catalysts should be taken when handling these substances (for example, exclusion of moisture, inert gas atmosphere).

EXAMPLE

Preparation of the titanium-containing catalyst component (1)

Step (1.1)

A precipitate is produced in an initially taken organic liquid by introducing and combining, with vigorous movement by constant stirring, (1.1.1) a 1.5 molar solution of titanium tetrachloride in n-heptane, (1.1.2) a 1.5 molar solution of an organoaluminum compound of the empirical formula $R_nAlCl_{3-n}$, where n is 2 and R is ethyl, in n-heptane and (1.1.3) ethene.

According to the invention, the specific procedure is as follows: the precipitate is produced at 0° C. in an initially taken organic liquid which has a viscosity of 11 mm²/s at the precipitation temperature and consists of (a) n-heptane (100 parts by weight) and (b) a relatively small amount (0.9 parts by weight), dissolved therein, of a homopolymer of isobutene, which has a solution viscosity (according to DIN 53,728/Sheet 4) of 600 cm³/g, with the provisos that (i) a total of 4 liters of the initially taken organic liquid, a total of 2 g mol of the organoaluminum compound and a total of 60 g mol of ethene are used per g mol of the titanium tetrachloride used in total, and (ii) per molar unit of the titanium tetrachloride used in total, 0.008 molar unit per minute is converted to the precipitated product and 0.15 molar unit per minute of ethene is introduced into the precipitation system.

The resulting suspension is transferred to a frit at room temperature, washed several times with n-heptane and dried. This gives a precipitated product whose titanium content is 2.4% by weight.

Step (1.2)

The precipitated product obtained in (1.1) is suspended in n-hexane (weight ratio 1:4) and, with thorough mixing by stirring, is combined with a 1.6 molar solution of n-butyllithium in n-hexne, with the provisos that (i) the substances combined are left at from 22° to 28° C. for 3 hours and (ii) 2 g mol of the organolithium compound are used per g mol of titanium in the precipitated product; the resulting solid-phase product is the titanium-containing catalyst component (1).

To isolate the catalyst component (i), it is separated from the liquid phase on a frit, washed several times with n-hexane and dried; its titanium content is 2.3% by weight.

Polymerization using the catalyst component (1) described above

The polymerization is carried out continuously in a cylindrical polymerization reactor which has a capacity of 1.5 l and a height/diameter ratio of 2.1:1.0, contains a helical stirrer and is filled to 5/7 of its height with finely divided polymer as the polymerization medium during the polymerization in the continuous steady state.

Specifically, the polymerization process is designed so that the polymerization medium is a central stirred bed of finely divided polymer, with the provisos that ($b_1$) the polymerization medium is moved upward in the peripheral region of the stirred bed and downward in the central region of the said bed in such a way that the Froude number in the stirred bed is 2.67, and ($b_2$) in the polymerization medium, the heat of polymerization is essentially removed by expansion cooling in such a way that ($b_{2.1}$) the monomer to be polymerized outside the reaction space is brought to a temperature which is 90° C. below the temperature of the reaction medium and to a pressure which is 45 bar above the pressure of the reaction medium, ($b_{2.2}$) an excess amount of this mixture is let down into the stirred bed, ($b_{2.3}$) the remainder (about 80%) of the monomer not consumed by polymerization is removed from the reaction space, and (b2.4) after the monomer consumed by polymerization has been replaced and the temperature and pressure conditions selected for ($b_{2.1}$) have been restored, this remainder is circulated and let down again into the stirred bed.

Under these conditions, ethene is polymerized at 100° C. in the absence of liquid diluents under a reactor pressure kept constant at 35 bar by the intermittent addition of 3 g/hour of the catalyst component (1) described above and 6 g/hour of triisobutylaluminum as catalyst component (2) (≅an atomic ratio of Ti to Al of 1:18).

50 kg/hour of granular polyethene are formed in this manner during continuous steady-state operation, the said polyethene being removed from the reactor.

More detailed information about the morphology of this polyethene is given in the Table below.

COMPARATIVE EXPERIMENT

The procedure followed is the same as that described in the Example, except that, instead of the novel catalyst component (1), the same molar amount (based on titanium) of the precipitated product obtained in step (1.1) is used, stage (1.2) being dispensed with.

45 kg/hour of granular polyethene are obtained in this manner.

More detailed information about the morphology of the polyethene is likewise given in the Table below.

TABLE SHOWING SIEVE ANALYSIS

| | Particle size [mm] | | | | | |
|---|---|---|---|---|---|---|
| | <0.125 | 0.125–0.250 | 0.250–0.5 | 0.5–1.0 | 1.0–2.0 | >2.0 |
| Example | 0 | 0.9 | 61.4 | 35.2 | 1.7 | 0.8 [% wt.] |
| Comparative Experiment | 0.2 | 3.9 | 41.8 | 28.8 | 13.5 | 1.8 |

The Table shows that, in the Example according to the invention, both the very fine fraction and the oversize of the polymer are substantially reduced compared with the Comparative Experiment, and the amount of product in the desired particle size range (0.25–1 mm) is therefore increased from 70.6 to 96.6% by weight.

We claim:

1. In a process for the preparation of finely divided homopolymers of ethene or copolymers of ethene with minor amounts of a $C_3$–$C_8$-alpha-mono-alkene by polymerization of the monomer or monomers at from 30° to 150° C. under from 1 to 200 bar using a Ziegler catalyst system consisting of
   (1) a titanium-containing catalyst component obtained by
   (1.1) first of all producing a precipitate in an initially taken organic liquid by introducing and combining, with vigorous movement,
   (1.1.1) a 0.1–10 molar solution of titanium tetrachloride in a liquid saturated aliphatic and/or aromatic hydrocarbon of 5 to 10 carbon atoms,
   (1.1.2) a 0.1–10 molar solution of an organoaluminum compound of the empirical formula $R_nAlCl_{3-n}$, where n is from 1.5 to 3 and R is alkyl of 1 to 12 carbon atoms, in a liquid saturated aliphatic and/or aromatic hydrocarbon of 5 to 10 carbon atoms, and
   (1.1.3) a $C_2$–$C_8$-alpha-monoalkene,
   with the provisos that (i) a total of from 2 to 20 liters of the initially taken organic liquid, a total of from 0.5 to 5 g mol of the organoaluminum compound and a total of from 5 to 500 g mol of the alpha-monoalkene are used per g mol of the titanium tetrachloride employed in total, and (ii) per molar unit of the titanium tetrachloride employed in total, from 0.002 to 0.15 molar unit per minute is converted to a precipitate, and from 0.02 to 1 molar unit per minute of the alpha-monoalkene is introduced into the precipitation system, and
   (1.2) then producing a solid-phase product by combining, with thorough mixing, the precipitate obtained according to (1.1), which is present in a liquid saturated aliphatic and/or aromatic hydrocarbon of 5 to 10 carbon atoms, with a 0.1–10 molar solution of an organolithium compound of the empirical formula LiR, where R is alkyl of 1 to 12 carbon atoms, in a liquid saturated aliphatic and/or aromatic hydrocarbon of 5 to 10 carbon atoms,
   with the provisos that (i) the substances combined are left at from −10° to 60° C. for from 0.5 to 12 hours and (ii) from 0.1 to 20 g mol of the organolithium compound are used per g mol of titanium in the precipitate, and
   an aluminum-containing catalyst component which is a trialkylaluminum which contains 1 to 12 carbon atoms per alkyl group,
   with the proviso that the atomic ratio of titanium from the catalyst component (1) to aluminum from the catalyst component (2) is from 1:1 to 1:200,
   the improvement which comprises using as the titanium-containing catalyst component (1) one in which the precipitate of stage (1.1) has been produced at from −10° to 10° C. in an initially taken organic liquid which has a viscosity of from 5 to 15 mm$^2$/s at the precipitation temperature and consists of (a) a liquid saturated aliphatic hydrocarbon of 6 to 8 carbon atoms and (b) relatively small amounts, dissolved therein, of a homopolymer of isobutene.

2. A process as defined in claim 1, which is carried out as a dry-phase polymerization process.

* * * * *